Feb. 18, 1930.　　　　C. GUERITEY　　　　1,747,626
FEED MECHANISM FOR CAN HEADING MACHINES
Filed Aug. 16, 1927　　10 Sheets-Sheet 1
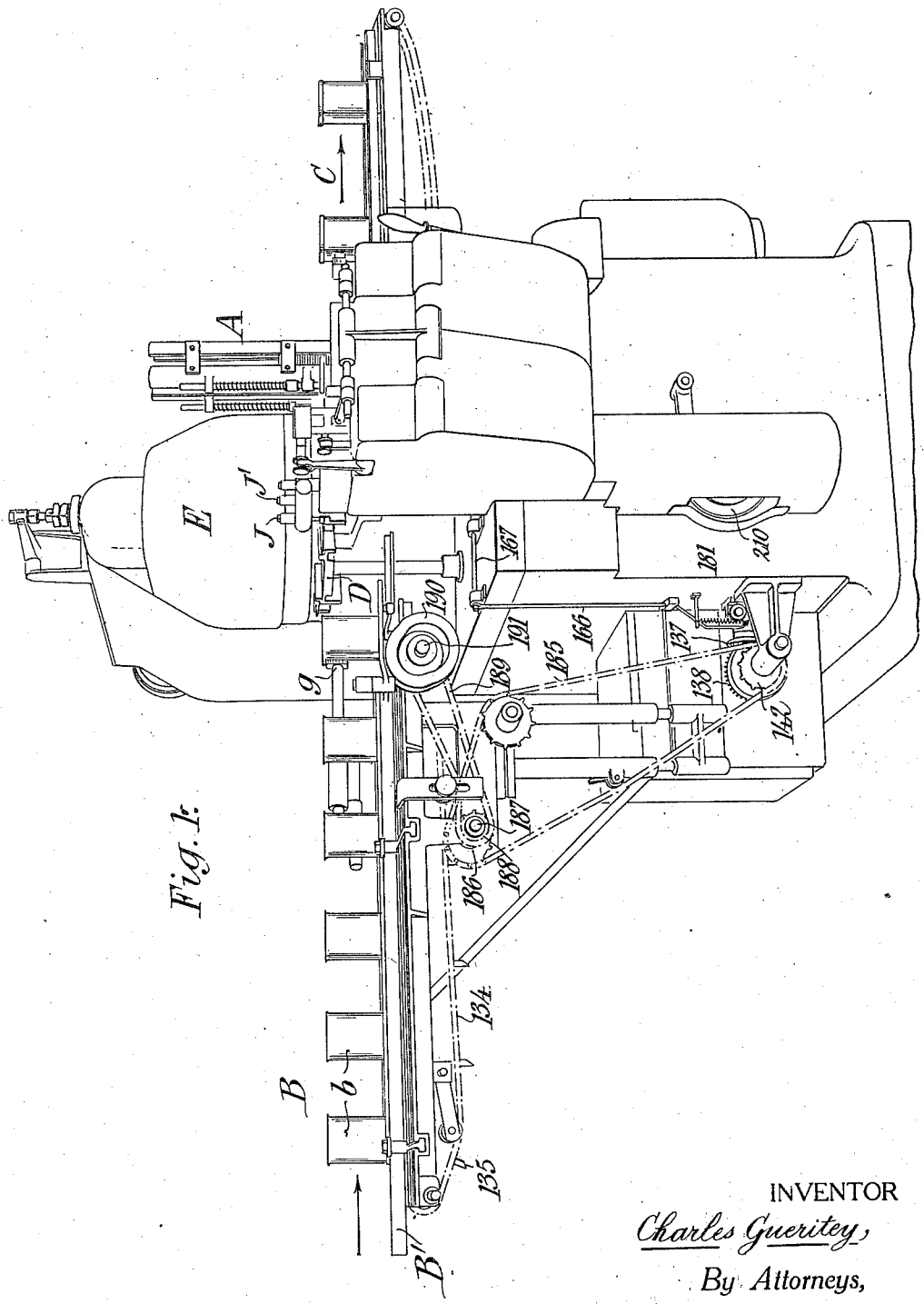
INVENTOR
Charles Gueritey,
By Attorneys,
Fraser, Myers & Manley

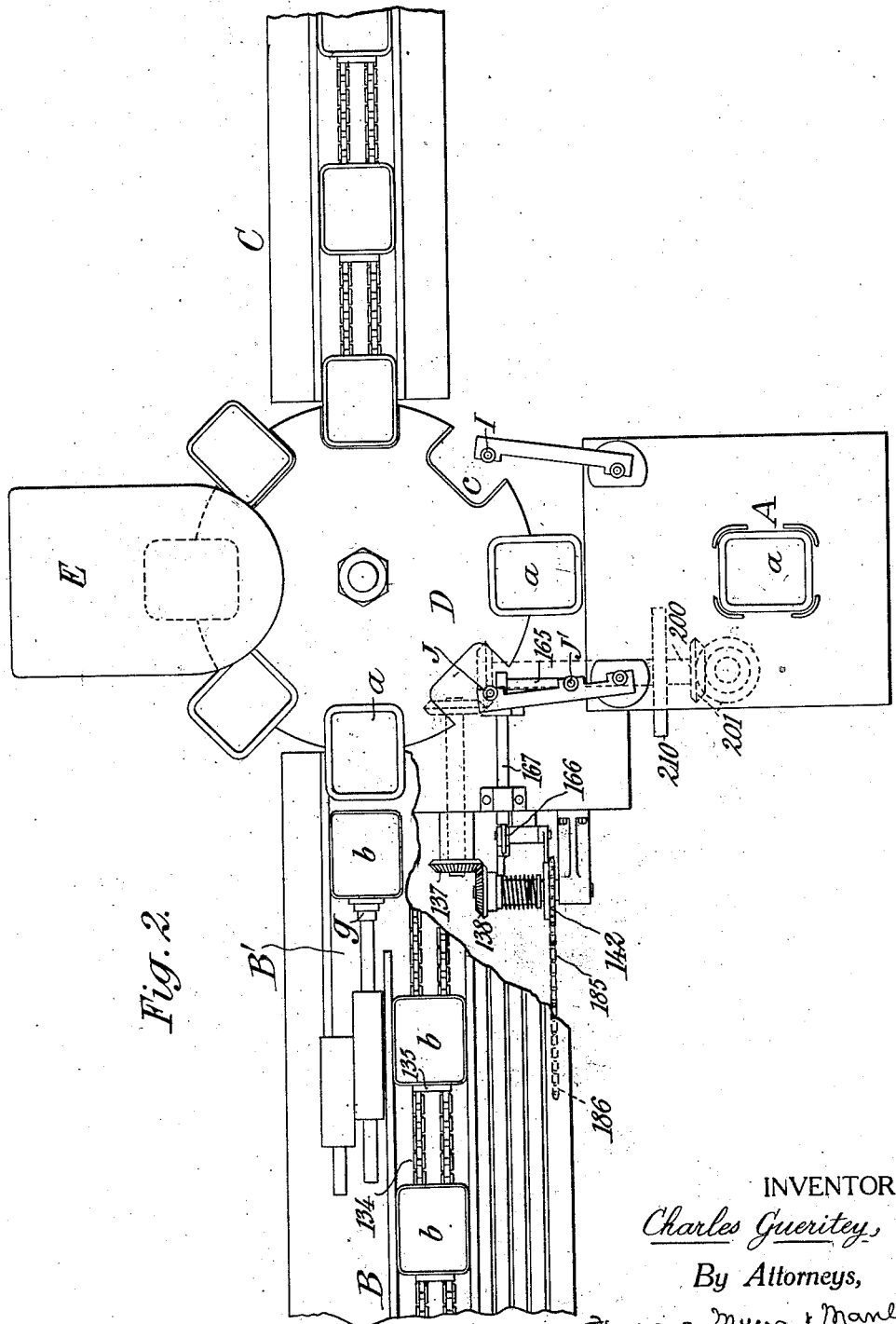

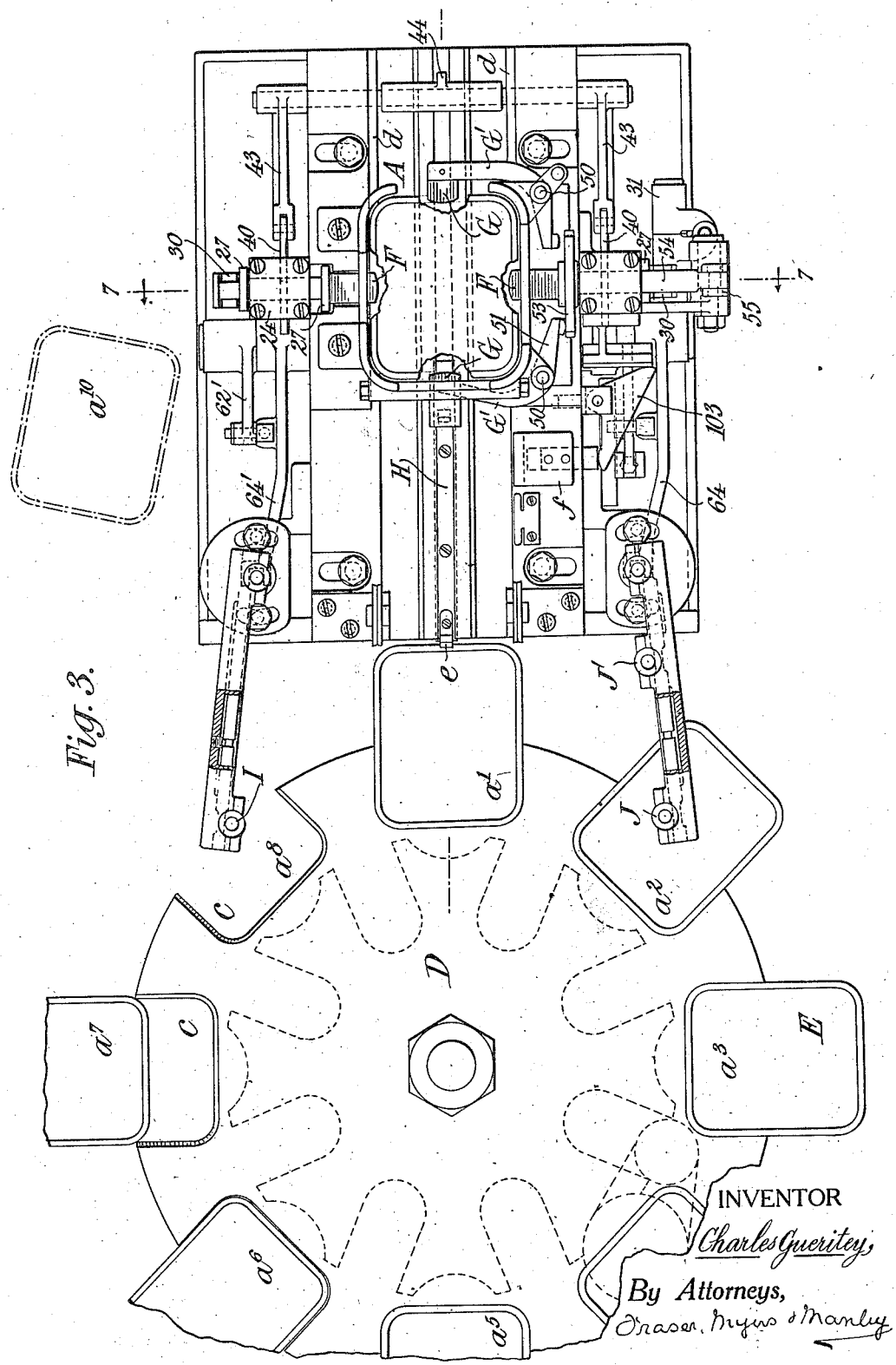

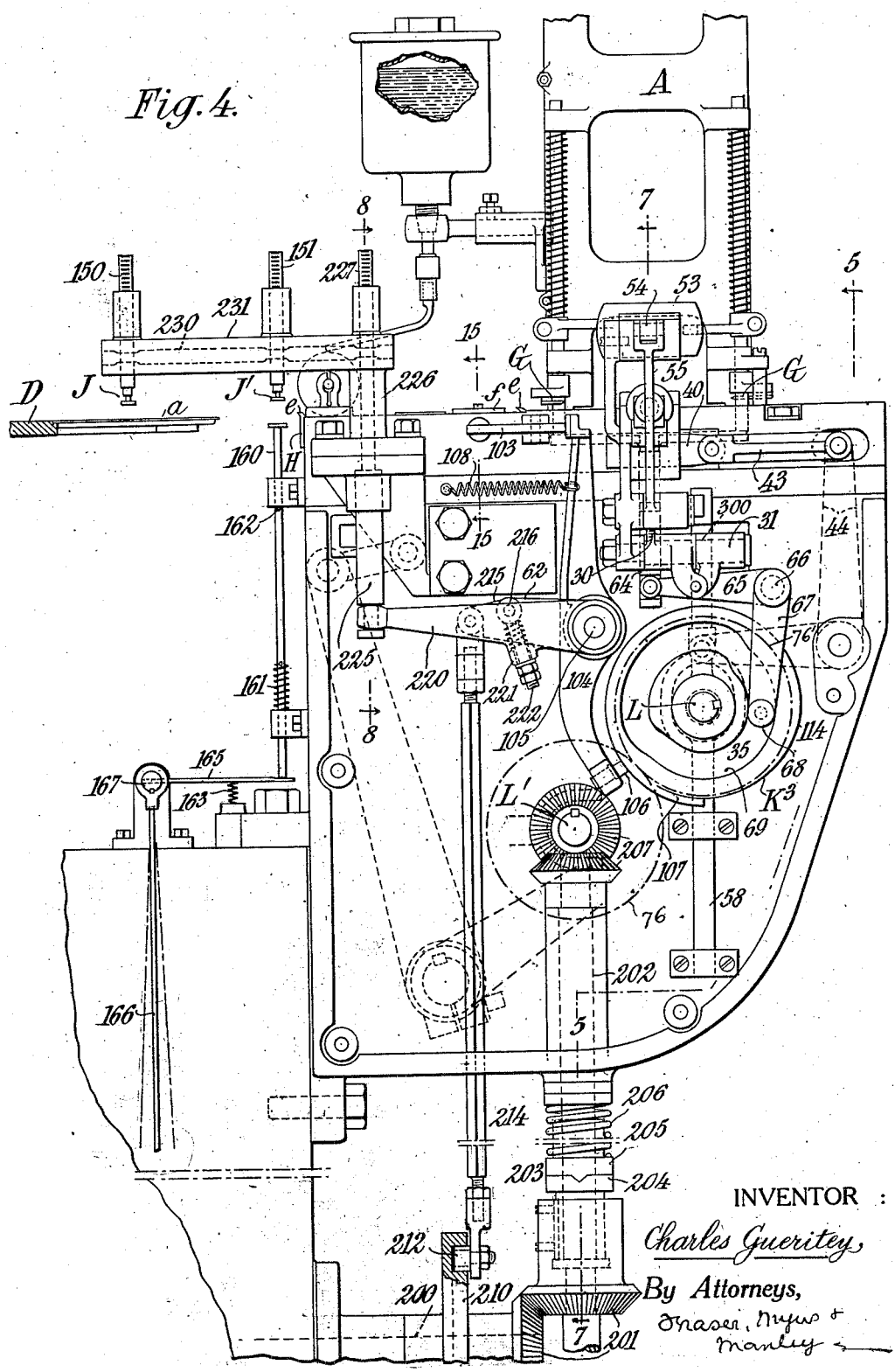

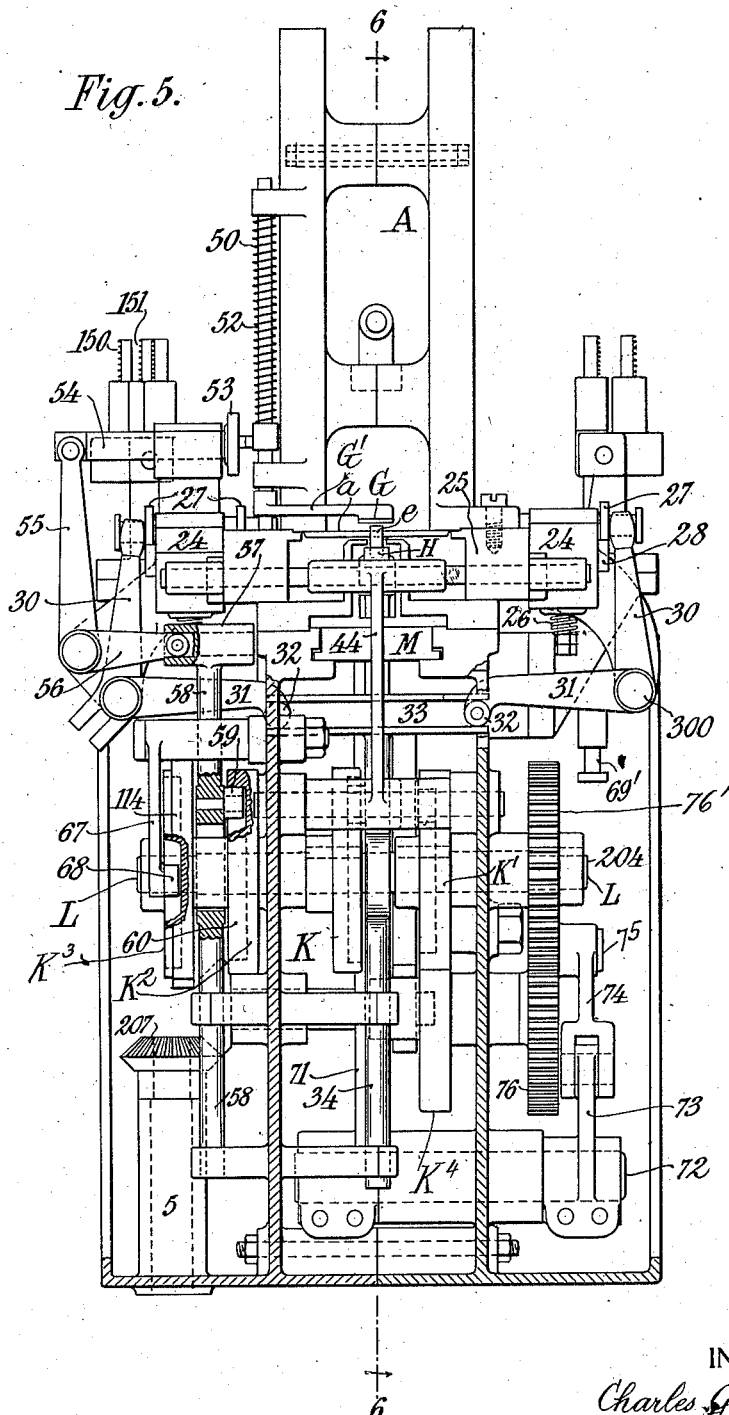

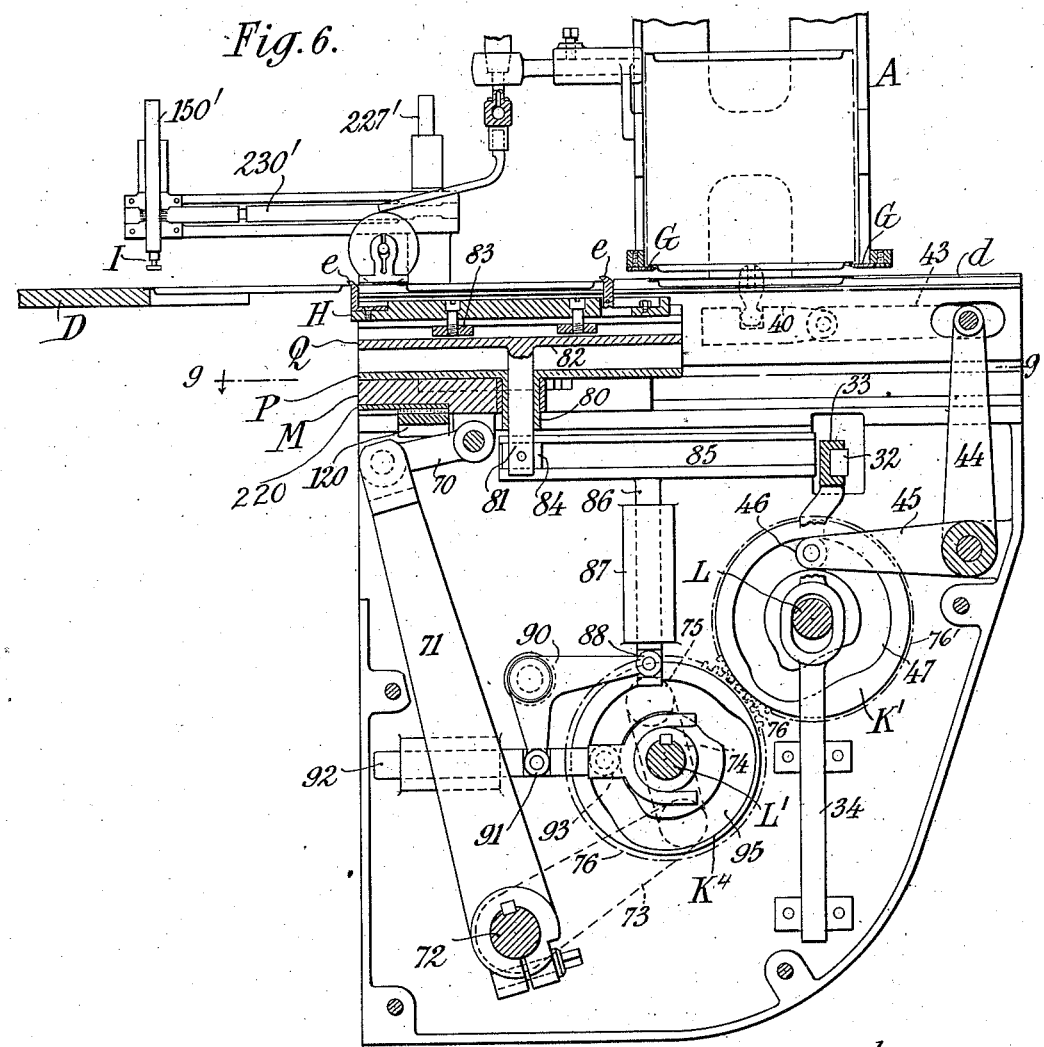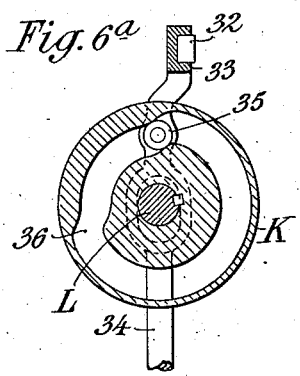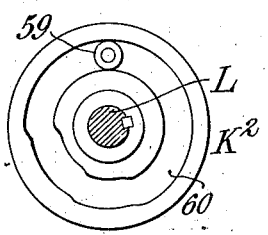

Feb. 18, 1930.  C. GUERITEY  1,747,626
FEED MECHANISM FOR CAN HEADING MACHINES
Filed Aug. 16, 1927   10 Sheets-Sheet 7
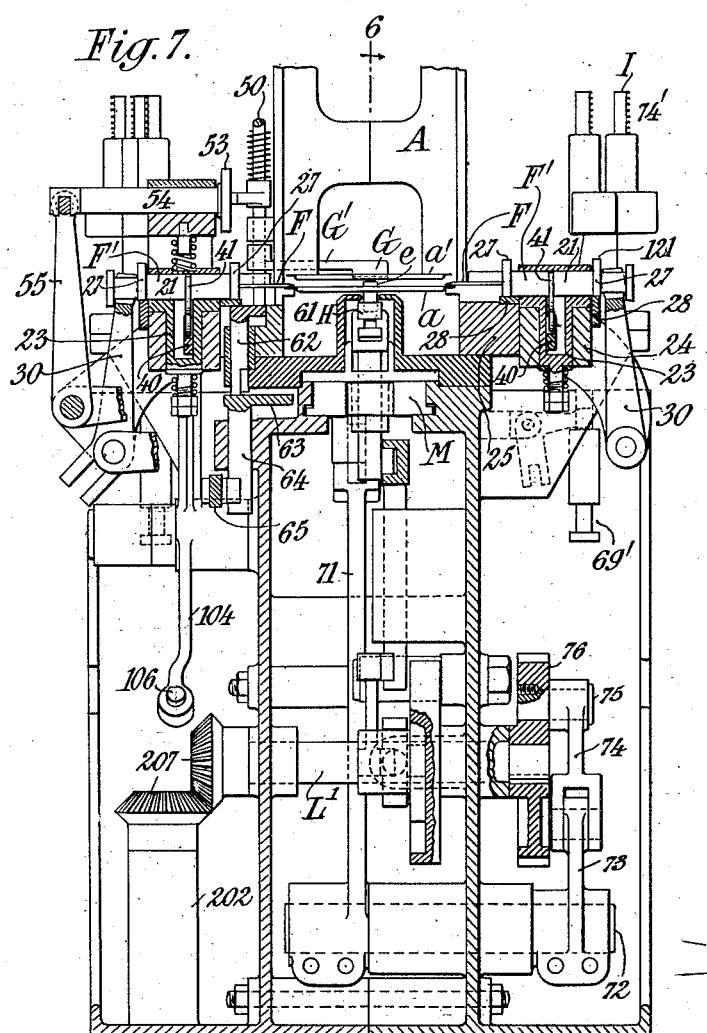
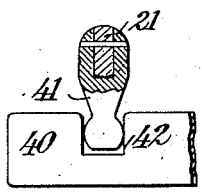
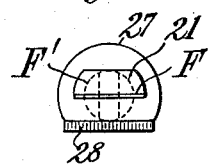
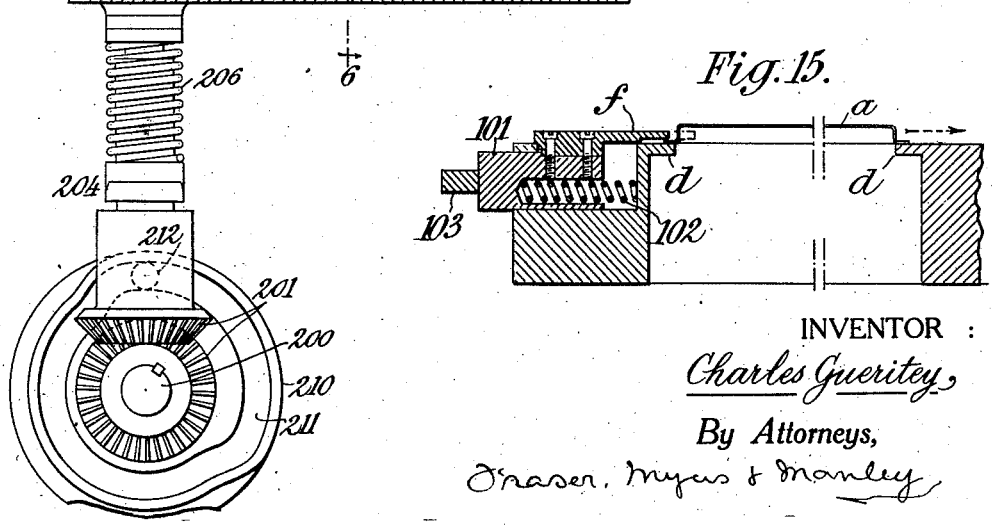
INVENTOR:
Charles Gueritey,
By Attorneys,
Fraser, Myers & Manley Feb. 18, 1930.　　　　C. GUERITEY　　　　1,747,626
FEED MECHANISM FOR CAN HEADING MACHINES
Filed Aug. 16, 1927　　10 Sheets-Sheet 8
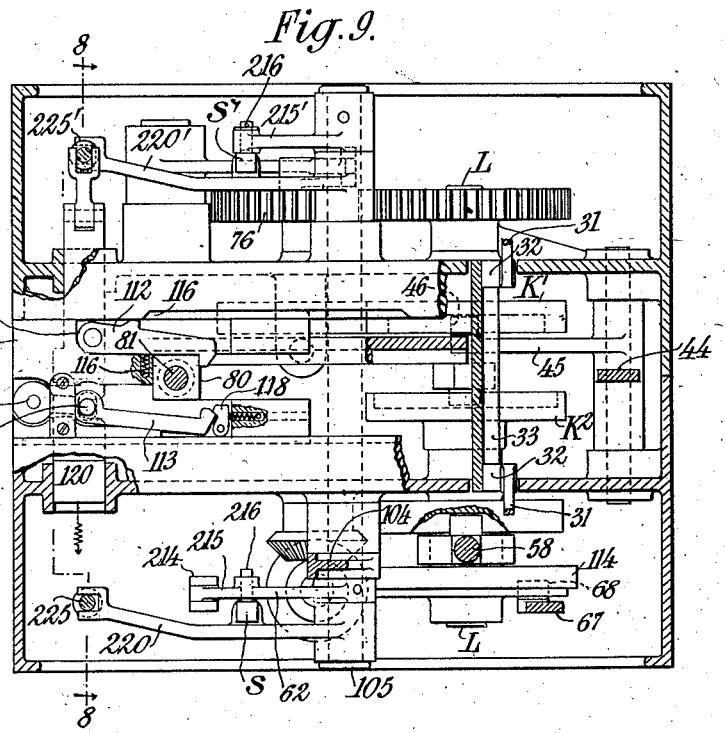
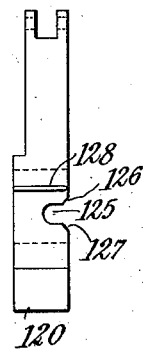
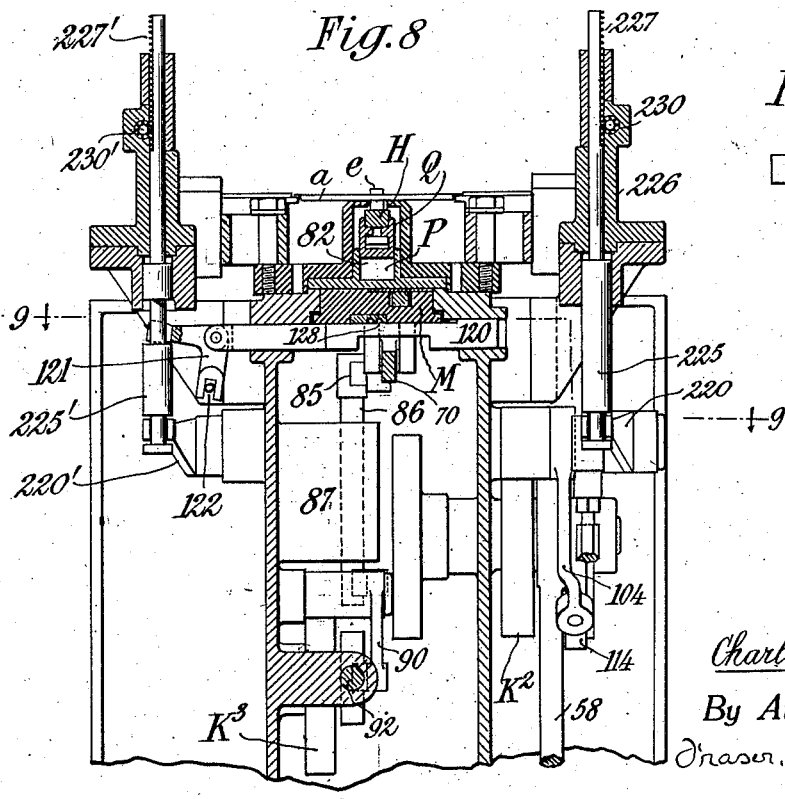
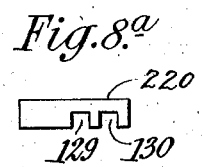
INVENTOR:
Charles Gueritey,
By Attorneys,
Fraser, Myers & Manly Feb. 18, 1930.  C. GUERITEY  1,747,626
FEED MECHANISM FOR CAN HEADING MACHINES
Filed Aug. 16, 1927  10 Sheets-Sheet 9

INVENTOR
Charles Gueritey,
By Attorneys,
Fraser, Myers & Manley

Feb. 18, 1930.   C. GUERITEY   1,747,626
FEED MECHANISM FOR CAN HEADING MACHINES
Filed Aug. 16, 1927   10 Sheets-Sheet 10
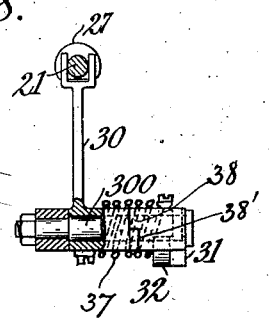
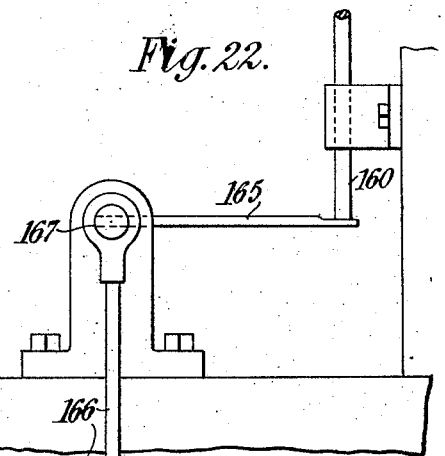
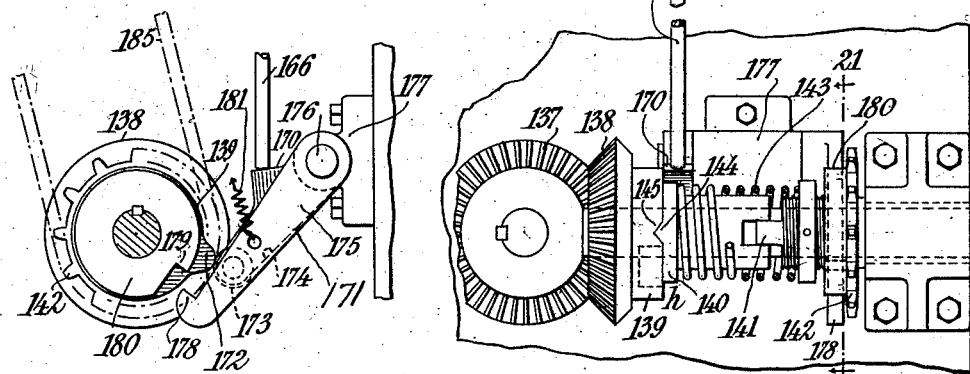
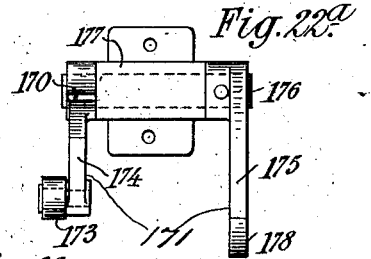
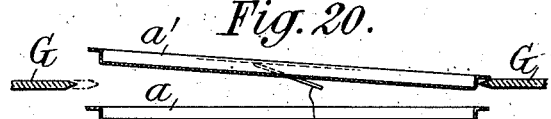
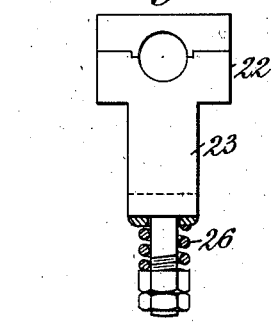
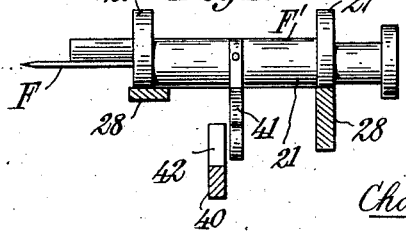
INVENTOR:
Charles Gueritey,
By Attorneys,
Fraser, Myers & Manley Patented Feb. 18, 1930

1,747,626

UNITED STATES PATENT OFFICE

CHARLES GUERITEY, OF PASSAIC, NEW JERSEY

FEED MECHANISM FOR CAN-HEADING MACHINES

Application filed August 16, 1927. Serial No. 213,335.

This invention relates to mechanism for feeding can bodies and can heads to a can-heading mechanism. The can heads are fed from the bottom of a stack of superincumbent heads. The cam bodies are fed from a conveyor which delivers them successively. The heads and bodies are received in pockets or recesses in an intermittently-rotating carrier of the turntable or dial type. The bodies and superimposed heads are carried to a can-heading mechanism which acts upon them successively to seam down the heads.

The objects of the present invention are to improve mechanism of this character to render it more certain in operation, to increase its speed and output, and to insure that the heads and bodies shall be fed in synchronism and brought together for the formation of perfect headed cans. Means are provided for stopping the body feed in case of failure to feed a head, and for stopping the head feed in case a previously fed head has not received its complementary body. The invention provides improved means for separating the bottom head of a stack from the superincumbent heads with accuracy and certainty.

The accompanying drawings illustrate a machine embodying what is believed to be the preferred form of the present invention, in which,—

Figure 1 is a perspective of the machine on a small scale.

Fig. 2 is a plan of the machine.

Fig. 3 is a plan on a larger scale, certain portions being broken away.

Fig. 4 is an elevation viewed from the right in Figs. 2 and 3.

Fig. 5 is a vertical section taken approximately in the planes of the lines 5—5 in Figs. 4 and 6.

Fig. 6 is a vertical section in the plane of the line 6—6 in Fig. 5, being viewed from the same direction as Fig. 4.

Figs. 6a and 6b are details of Fig. 6.

Fig. 7 is a vertical transverse section taken approximately in the plane of the lines 7—7 in Figs. 4 and 6.

Fig. 8 is a vertical transverse section taken approximately in the plane of the lines 8—8 in Figs. 4 and 9.

Fig. 8a is an end view of a grooved plate 220 inserted in the feed slide M.

Fig. 9 is a horizontal section taken in the plane of the lines 9—9 in Figs. 6 and 8.

Fig. 10 is a detail of Fig. 9.

Fig. 13 is a sectional detail of Fig. 11.

Fig. 14 is a detail view of the tilting separator.

Fig. 14a is a diagram illustrating the operation of the tilting separator.

Fig. 15 is a transverse section on the same scale as Figs. 11 to 14, showing the ejector, the plane of the section being shown by the line 15—15 in Fig. 4.

Fig. 16 is an enlargement of the part F' and connected parts in Fig. 7.

Fig. 17 is an elevation of the part 23, Fig. 7.

Fig. 18 is a detail sectional elevation of the arm 30, Fig. 7, and its connected parts.

Figs. 19 and 20 are sectional views showing different stages in the operation of separating the heads.

Fig. 21 is a sectional view, and

Figure 11:
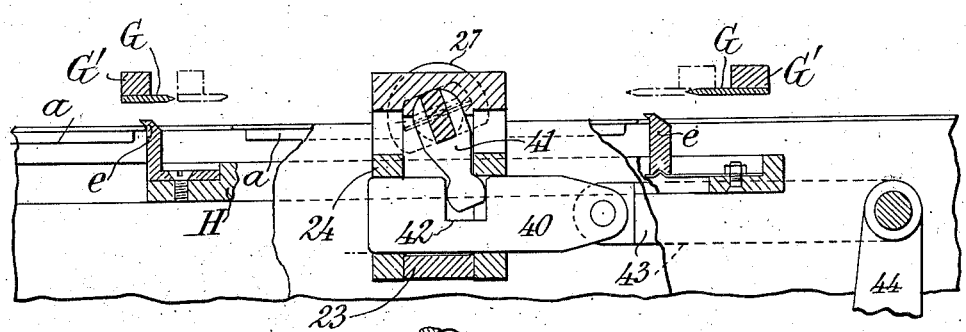
Fig. 11 is an enlarged section viewed from the right in Fig. 3, the section being in several planes, as indicated by the dotted line 11—11 in Fig. 12.

Fig. 22 an elevation, showing the mechanism for disconnecting the body feed in case of a mis-feed of a head.

Fig. 22a is a front view of the connected lever arms of Figs. 21 and 22.

Referring to the drawings, the can heads $a$ are superposed in a stack held in a suitable reservoir or stack holder A. The can bodies $b$ (which term as herein used includes either bottomless bodies or bottomed bodies or cans, either filled or unfilled) are fed on any suitable conveyor B. The headed bodies or cans are carried away on a conveyor C. The heads and bodies are assembled by means of a carrier D which is preferably of the intermittently-rotating dial type, and which constitutes the most convenient of the known means for carrying the heads and bodies in assembled relation to the heading or head seaming mechanism.

In the construction shown, the carrier D (which will be referred to as a dial) is formed as a disk with radial recesses $c$ $c$ for receiving the heads which are automatically fed into the successive recesses from the stack. The dial is turned intermittently an angular distance equal to the spacing of these recesses, a new head being fed to it at each such movement. With the arrangement and proportions shown (which may of course be varied) the dial, after receiving any head, makes a quarter turn and then receives from the conveyor B a body which is fed to its recess just beneath the head; it then makes another quarter turn, whereby the head and body are brought to the head-seaming mechanism E, which in the machine illustrated is arranged diametrically opposite the head-feeding means. While stopping in this position the usual head-seaming operations are performed,—that is to say, a pad lifts the body, together with the head resting upon the flanged top of the body, until their respective flanges are brought to the level of the seamers, whereupon the seaming mechanism acts in the well understood manner to double-seam the flanges of the head and body together; the seamed can is then lowered back into the recess $c$ of the dial. The next movements of the dial carry the seamed body or can, and when brought in line with the conveyor C, the seamed bodies are carried off in a radial direction.

The general description thus given will serve to indicate the type of feeding and head seaming machine to which the improvements constituting my invention apply. A more particular description of these improvements will now be given. For clearness only those parts which directly act upon the heads and bodies will be first described, the mechanisms for imparting movement to these elements being reserved for later description.

*Separating the heads.*—In feeding out the bottom head from a stack a serious problem is encountered in properly separating the bottom head from the superincumbent heads of the stack. The heads (being of the usual dished form) are nested together and are rarely held quite level or parallel, being commonly tilted somewhat, and often the flanges on one side or the other being in such close metallic contact that it is practically impossible to insert a separating blade between them. When in this close contact on one side, however, the flanges are necessarily somewhat separated on the opposite side; and this fact is availed of to assist in their automatic separation by the means to be described.

Adjacent the stack of heads at the bottom thereof, are two opposite separators F F, and two opposite lifters G G, these respective devices being arranged in pairs, the two of each pair being moved simultaneously toward the heads of the stack, the separators making this movement first, and the lifters making their approaching and engaging movement later.

The separators F F are formed as knives or blades mounted on opposite sides of the heads and movable to reciprocate in synchronism toward and from the center. Their level is such that as they approach they enter just above the flange of the lowermost head; and if the next head is level they should both enter between the flanges of the lowest and next higher head. If, however, these flanges are pressed tightly together on one side, the separator blade on that side cannot enter, but is stopped by contact with the edges of these flanges (or more exactly, by the edge of the flange of the next to the bottom head), and is so mounted as to yield to this obstruction, so that it stops in abutment against the head flange while the separator blade on the opposite side, finding a free opening between the flanges, enters this opening. As the result of this approaching movement of the separators, one or both of them have entered between the respective flanges. The separators are then given a tilting or rocking movement, so that if both are between the flanges they act to lift the flanges on the next to the bottom head, and thereby to lift bodily the entire stack, thereby separating the stack from the lowermost head so as to free the latter and permit it to be later fed out. If only one separator has entered between the flanges, its rocking movement alone will be effective, so that the stack of heads will be lifted only on that side. The separator on the other side, if it executes the same rocking movement, will do so idly; or, preferably, it will simply remain stationary without tilting. The separator which enters (or both if both enter) makes a double rocking movement which first lifts the superincumbent heads on one side and then lifts them on the opposite side.

*Lifting the stack.*—The lifters G G are formed as blades movable horizontally in a plane just above the level of the flange of the lowest head. Upon the first rocking movement of the separator which has entered between the flanges, the lifting of the superincumbent heads on one side enables the lifter G on that side to enter above the flange of the bottom head. The next rocking movement of the separator, by tilting to the opposite side, lifts the superincumbent heads on the other side so as to admit the entry of the second lifter above the flange of the bottom head. These movements are shown diagrammatically in Figs. 19 and 20. In Fig. 19 the separator F has tilted in the manner shown in Fig. 11, thereby lifting the lowest superincumbent head $a'$ at its right-hand edge above the bottom head $a$, whereupon the right lifter blade G enters between this flange. In Fig. 20 the separator blade F has rocked in the opposite direction, thereby lifting the left-hand flange of the head $a'$ above the level of the right-hand lifter blade G, whereupon this blade will enter to the position shown in dotted lines. Thus the double rocking movement of the separator F insures that both lifters may enter under opposite flanges of the superincumbent head $a'$.

To co-operate with this double rocking of the separators, the lifters G G are given successive movements, whereby the right-hand lifter in Figs. 11, 12, 19 and 20 first enters to the position between the flanges shown in dotted lines in these figures; then by the second tilting movement of the separator F, as shown in Fig. 20, the left-hand lifter completes its movement, so as to enter between the flanges at the left.

When both of the lifters G G have thus entered beneath the flanges of the head $a'$, they then move bodily upward for a short distance, thereby lifting the lowermost head of the stack off from the separator or separators, and to a hight sufficient to free it from the bottom head beneath, so that the latter is released from engagement with the superincumbent heads. As soon as the lifters begin to act in this lifting movement, the separators are retracted or moved outwardly beyond the flanges of the heads.

*Feeding the heads.*—The bottom head having thus been liberated by the lifting of the stack of superincumbent heads, is free to be fed. Its opposite flanges rest on two parallel rails or ledges $d\ d$, along which it may be slid in feeding it forward to the die. The feeding movement is imparted by feed fingers $e$, one of which comes behind the head and pushes it forward (to the left in Figs. 6, 11 and 12). These feed fingers or pushers are carried on a feed slide H which is given a reciprocatory movement; after each forward movement the feed slide descends to a slightly lower level sufficient to free the feed fingers $e$ from the heads; it then slides backward idly, the primary feed finger $e$ moving back wholly beneath the lowermost head which is next to be fed, and the secondary finger likewise moving back beneath the head which was last fed. With the proportions shown, the head beneath the stack is first moved to an intermediate position, and then after the return movement of the feed slide is again moved to the position shown at the left in Figs. 3 and 6, where it is seated in one of the recesses $c$ in the dial.

*Misplaced heads.*—It occasionally happens that a head is misplaced in the stack by being inverted. When this occurs, since its flanges rest upon those of the next lower head, difficulty is apt to be experienced in separating out the lowest head, because the separator blades may not on either side enter between these flanges. In such case the feed of heads stops until the operator removes the inverted head. When, however, the separation takes place properly, then when the inverted head is being fed along it is necessary to eject it from the machine. This ejection is performed in the intermediate stopping position by means of an ejector or knock-out $f$, best shown in Fig. 15. This ejector is essentially a reciprocating piece which moves sufficiently above the rails $d\ d$ to avoid the flange of the head, but so that if the head is inverted it strikes the side of the dished portion of the head. The ejector reciprocates once to each feeding movement by moving transversely to the direction of feed, and executing a somewhat sharp or violent movement, so that it kicks out sidewise the inverted head. It is shown in plan in Fig. 3, and an ejected head being thrown out is shown at $a$ in that figure.

*Assembling heads and bodies.*—The means for insuring the correct assembly of the heads and bodies involves control of the body feed, so that when a head has not been fed to the dial there will be no feeding of a body to meet the missing head. Otherwise a body would be fed into place and in the seaming position would be pushed up to the seamers and seamed without any head, thereby destroying the body. For the purpose of this control an intermediate feeding position is utilized. In Fig. 3 the head is fed in position $a^1$; the next movement of the dial carries it to position $a^2$, and in position $a^3$ the body is fed beneath the head. In position $a^2$ a feeler J drops down, and if the dial carries a head in this position, this feeler in descending strikes the head and its descent is arrested. By mechanism to be described later, this arrest of the feeler permits the normal feed of the can body to position $a^3$ in proper time to come under the head when it has been at the next movement carried to that position. If, however, in position $a^2$ the head is missing, the feeler J will descend for its full stroke, and in such descent will arrest the can body feed, so that when the empty recess $c$ of the dial reaches position $a^3$, no body will be fed to it and the seamer will receive no work when this recess reaches the seaming position.

*Missed body feed.*—Occasionally the body-feeding mechanism will fail to feed a body underneath the previously fed head. When this occurs, the head is simply carried around by the dial without any seaming operation taking place; because in the seaming position the head is not lifted to the seaming level, due to the absence of any body beneath it. Also in the out-feeding position the head is not fed out because the out-feed engages the sides of the body and the head is only fed when seamed, and as a part of the body; consequently the head remains in the recess $c$ and is brought around eventually to the original feeding position $a^1$. If no provision were made for taking care of such occurrence, a second head would be fed in against or on top of this head in position $a^1$. This is prevented by means of another feeler I similar in its character to the feeler J, but located to encounter the head in the position $a^8$. Under normal conditions, when no head is carried to this position, the feeler I makes a full descending stroke; but if a head has been carried around to this position, the feeler in descending strikes the head and its arrest after executing only a partial stroke, accomplishes (through mechanism which will be later described) a stoppage for one feeding stroke of the head-feeding mechanism. Thus the feeding of duplicate heads to the position $a^1$ is avoided.

Figure 12:
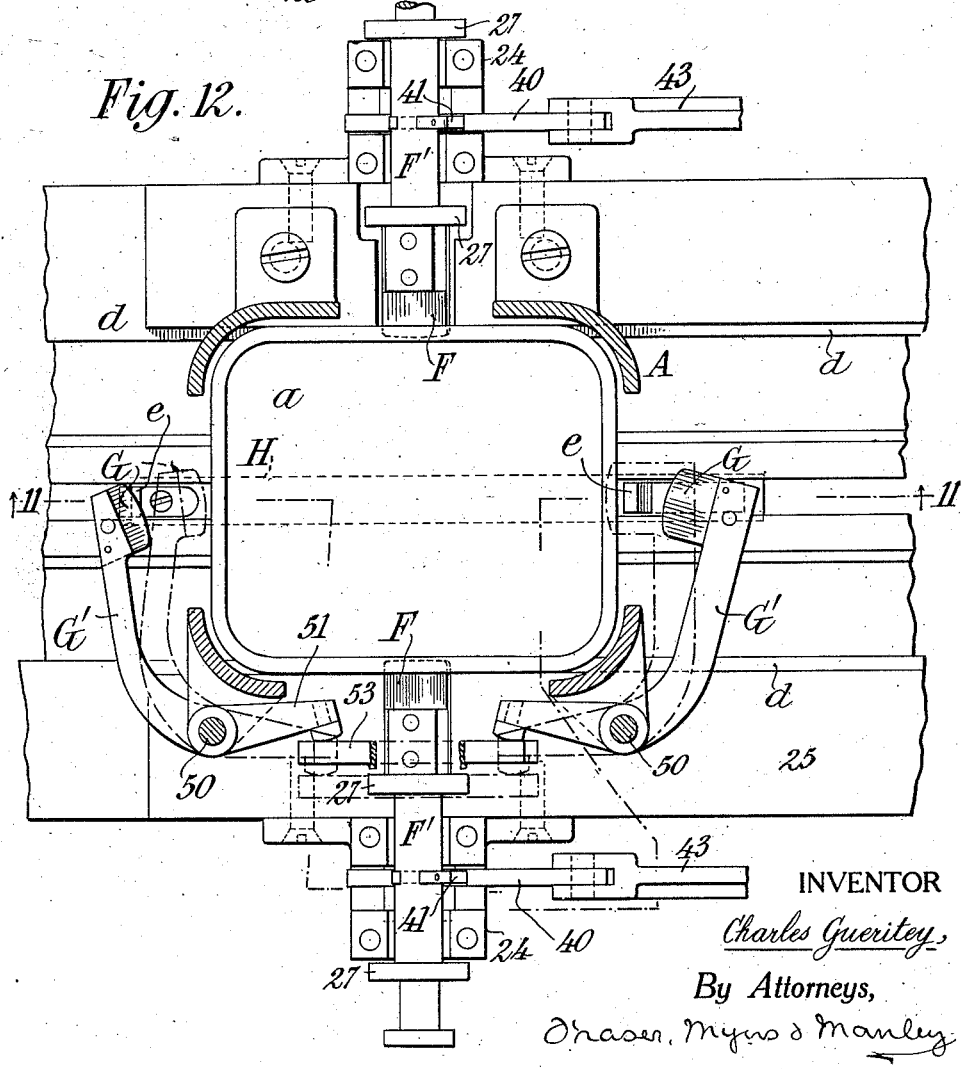
Fig. 12 is a horizontal section through the stack, showing the head feeders in plan, on the same scale as Fig. 11.

*Description of mechanism.*—The mechanisms by which the several devices thus far described are operated, will now be described:

*Stack and separators.*—The stack holder A is of any usual or suitable construction, being a skeleton frame conforming in horizontal cross-section to the contour of the heads. In this the stack of heads are held, the flange of the bottom head resting at opposite sides upon the ledges d d. The separators F F consist of flat blades or knives mounted each on a carrier spindle F', as best shown in Figs. 14 and 16. This spindle has a cylindrical journal portion 21 which turns in a bearing block 22 (best shown in Fig. 17), mounted on a vertical slide 23 which moves in a vertical slideway in a stationary piece 24 which, as shown in Fig. 12, is fastened fixedly to the main table 25 supporting the stack holder and feed mechanism. A spring 26 pulls down on the parts 22, 23, so as to hold the bearing block 22 normally down on the top of the fixed bracket 24. The spindle F' has two flanges 27 which are flattened on the bottom, as shown in Fig. 14, this flat portion resting on plates 28 forming part of the top of the table. The flanges 27 are outside of the bearing block 22, there being sufficient clearance between to permit of the advancing and retracting movements of the separator blades as they enter between the head flanges. This longitudinal movement is imparted by a forked lever arm 30 (Figs. 5 and 7), the fork of which enters between two flanges on the spindle F', and which arm is connected through a shaft 300 to another arm 31 (Fig. 5) carrying a roller 32 which is received in a groove between two flanges on a crosshead 33; this crosshead is formed on a vertical slide 34, which, as shown in Fig. 6ª, carries a cam roller 35 which is engaged by a cam groove 36 formed on a cam K carried on a shaft L. Thus in proper timing the respective separator blades f f are moved toward each other to enter between the head flanges and are retracted.

If in the advancing movement of the separators either blade encounters the edge of the head flange and is stopped, it is necessary that the remaining movement imparted by the cam be taken up by some yielding member. For this purpose it is best to introduce such yielding member between the arms 30 and 31. This is conveniently accomplished by applying a coiled spring 37 around the shaft 300, fastening one end to the hub of the arm 31, and mounting the arm 30 loosely, so that it may yield in one direction, and connecting the other end of the spring to the arm 30, in a manner which is illustrated in Fig. 18. On the back stroke the shoulder 38 on the hub of arm 31 strikes a shoulder 38' on the hub of the arm 30 and retracts this arm and the separator positively; on the forward stroke the arm is moved through the spring, and when the separator blade is stopped, the arm stops and the spring takes up the lost motion.

The rocking movements of the separators, whereby their blades pry apart the flanges of the heads, are imparted by means of reciprocating slides 40, one of which is shown in Fig. 11. These slides each move horizontally through slideways cut as slots in the fixed bearing 24 and intersecting the lower slide member 23 of the bearing block 22. Each spindle F' has fixed to it a downwardly-projecting arm 41 which enters into a chamber formed in the bearing block 23. The arm 41 has a rounded toe adapted to enter a notch 42 in the slide 40, as shown in Figs. 11 and 13. In the retracted position of the separator, this arm 41 stands outside of the notch, as shown in Fig. 16, but as the separator blade enters between the head flanges, the arm 41 is carried into the notch 42. If the blade is stopped by abutting against a head flange, the arm 41 does not enter the notch. At the end of such advancing movement the slide 40 is moved to the position shown in Fig. 11, so that if the arm 41 has entered its notch, the spindle F' is oscillated to the extent shown. In this oscillation the corners formed by the flats on the under side of the flanges 27 rock against the fixed plates 28 and thereby bodily lift the axis of the spindle F', and with it the bearing block 22, this motion being taken up by the spring 26. If, on the contrary, the separator blade was stopped by encountering a flange, the movement of the slide does not tilt the blade because the arm 41 is not engaged by the slot 42.

The slides 40 are each reciprocated by the mechanism shown in Fig. 6, where the slide 40 is connected by a link 43 to a lever arm 44 rigidly connected to an arm 45 carrying a roller 46 which runs in a cam and groove 47 formed in a cam $K^1$ on the shaft L. The double rocking movement of the separator F is accomplished by giving the slide 40 a movement first to one side of its middle (shown in Fig. 13), and then to the opposite side of that position. This is accomplished by the cam groove 47 of cam $K^1$ (Fig. 6), which is concentric during the stationary position of slide 40 and deviates to opposite sides of such concentric position to impart the respective rocking movements.

*Stack lifters.*—The stack lifters G G are conveniently mounted on swinging arms G' fastened on vertical oscillatory shafts 50 which have a double movement, namely, an oscillatory movement to swing the arms and advance or retract the lifters, and a vertical movement to elevate the lifters and thereby lift the stack of heads. The operating mechanism is best shown in Figs. 5, 7 and 12. Each shaft 50 has fixed to it an arm 51, and has around it a spring 52, the stress of which tends to advance the lifter blades G and acts to press the arms 51 against a plate 53 which is mounted on a slide 54 having a pivotal connection with the end of an arm 55 fixedly connected to an arm 56 carrying a roller which is received in a slot in a crosshead 57 formed on the top of a slide 58, which slide carries a roller 59 engaged by a cam groove 60 in a cam $K^2$ (Fig. $6^b$) carried on the same cam shaft L already referred to.

The movements of the two lifters G, whereby one enters between the flanges in advance of the other, are accomplished by closing the plate 53 which moves forward with a single movement to retract the blades G to execute its retreat in two movements, the first of which brings these blades from the positions shown in full lines in Fig. 12, to those shown in dotted lines in that figure; and the second of which again advances the left-hand blade (the right-hand one having reached the limit of its movement) to bring it between the flanges to the position shown in dotted lines in Fig. 20. This double movement is due to the conformation of the cam groove 60 of cam $K^2$ (Fig. $6^b$).

The lifting movement of the shafts 50 is accomplished by means of a rising and falling table 61 (Fig. 7) on which the bottoms of these shafts rest; the table 61 is carried on vertical pins 62 sliding in bores in the frame and resting on a lower table 63 which is carried on the top of a vertical slide 64 which, as shown in Figs. 4 and 7, engages at its lower end with the free end of an arm 65 pivoted at 66 and fixedly connected with an arm 67 which at its lower end carries a roller 68 engaged by a cam groove 69 in a cam $K^3$ (Fig. 4) carried on the same cam shaft L.

These mechanisms impart to the lifting blades first their successive entering movements whereby they enter beneath the separated stack of heads; then a lifting movement sufficient to carry them high enough to leave the lowermost head free; then after the feeding out of the lowermost head, a descending movement until the bottom head of the stack rests upon the supporting ledges, and finally a retractile swinging movement to bring the blades out from under the head flanges

*Head feeders.*—The feed bar H is carried by a main reciprocating slide M which is connected by a link 70 to a lever arm 71 (Figs. 6 and 7) mounted on a shaft 72 which also carries an arm 73 connected by a link 74 to a crank pin 75 mounted on a gear disk 76 on a shaft L'. Thus the crank pin movement is communicated to the slide M to reciprocate this. This reciprocating movement is communicated normally to the feed bar H, but when to avoid double feeding of a head the feed stroke is to be missed, the constantly reciprocating slide M will be disconnected from the feed bar H in a manner to be later described.

Between the feed bar H and the reciprocating slide M are a cradle P and a lifter Q. The cradle P (Fig. 6) normally rests directly on the reciprocating slide M and normally is locked to and moves with it. It carries a vertical slideway 80 in which is guided an upright shaft 81 serving as a slide. The upper end of the sliding shaft 81 has mounted fixedly upon it as a T head, a plate 82, being the bottom plate of the lifter Q. The lifter Q is a cross-shaped piece of the cross-section shown in Fig. 8, having at its upper part a slideway for guiding the feed bar H. This bar is held down in this slideway by suitable means such as the plates 83 (Fig. 6), which are fastened to the feed bar H and engage beneath the slideway formed in the lifter Q. It results that the rising and falling movements of the lifter are necessarily imparted to the feed bar. The lower end of the upright slide 81 carries a block 84 which enters a slideway 85 parallel to the feeding movement; this slideway is formed in a T head fixed on top of a vertically movable slide 86 guided in a fixed way 87. The lower end of this slide 86 has any suitable joint 88 whereby to connect it with an elbow lever 90, the lower arm of which has a joint 91 engaging a horizontal slide 92 which carries a roller 93 engaged by a cam groove 95 of a cam $K^4$ (Fig. 6) which is keyed on the shaft L'. The conformation of the cam groove 95 is such as to impart vertical reciprocating movements and dwells in proper timing with the horizontal reciprocating movements imparted by the crank-pin through the lever 71.

From these constructions it results that the feed bar H has four movements: first, a feeding movement whereby one of the feed-fingers e pushes a head forward; second, a descending movement to bring these fingers wholly beneath the heads; third, an idle backward movement, and, fourth, a rising movement to bring the feed-fingers up again into the operative plane.

*Ejector.*—The ejector or knock-out f (Fig. 15) is mounted on a sliding block 101 pressed backwardly by a spring 102, and once to each feeding movement suddenly projected forward by a kicker lever 103, best shown in Fig. 3, which is moved by the operation of a lever 104 pivoted on shaft 105 (Fig. 4), and having a toe 106 which is engaged by a snail cam 107 carried by the cam shaft L and shown as conveniently formed on the periphery of the cam K³. When the toe 106 drops off the end of the snail cam, the lever 104 executes a sudden movement under the impulsion of a strong spring 108. This movement occurs once to each feeding movement and during the resting of the feed head to the intermediate position between the stack and its fed position $a^1$. As already explained, this movement has no effect if the head has been fed right side up, but if the head is inverted, the ejector strikes its shoulder and drives it laterally out of the machine.

*Head feed interrupter.*—The means for interrupting the feed of the heads so as to avoid feeding a second head to a recess $c$ in the dial which already contains one, will now be described.

The feeler I, as described, has a rising and falling movement; if it descends freely through the recess $c$ it does not arrest the head feed; but if in descending it is arrested by the presence of a head in the recess, its stoppage arrests the feed. This it does by unlocking the cradle P (carrying the lifter Q and feed bar H) from its normal engagement with the reciprocating slide M. The unlocking means for this purpose is best shown in Figs. 8, 9 and 10.

The slide M is normally locked to cradle P by a hook 112 (Fig. 9) or by a hook 113. These are both pivoted to the slide M, the former at 114, the latter at 115. The hook 112 has a toe which in the sliding movement works in a cam groove 116, and in the position shown in Fig. 9, being beyond this groove, is forced into engagement with the square shank 80 of the cradle. At the beginning of the next reciprocation it will be pressed back by a spring 116′ to disengage it therefrom. Meanwhile in normal operation the hook 113 will have engaged the shank 80. This hook has a pin 117 projecting down through a slot in the slide M to be engaged by a transverse slide 120 shown separately in Fig. 10. This transverse slide is connected, as shown in Fig. 8, to the feeler I, so that its position depends upon the position of the feeler. The connection shown is through an elbow lever 121 pivoted to the slide, having one forked arm engaging a fixed pin 122, and its other forked arm lying over a shoulder on a vertical slide 225′ connected to the feeler I, so that as the latter moves up or down, the slide 120 is moved to the right or left (Fig. 8). This slide (Fig. 10) has a notch 125 adapted to receive the pin 117. To either side of this notch are inclines 126 and 127 which, if the notch does not coincide in position with the pin 117, will, one or other of them, be struck by the pin in order thereby to swing the hook 113 into or out of engagement with the square shank 80 of the cradle P. The hook 113 is engaged at its end by a spring-pressed pawl 118 which holds it either in the position shown in Fig. 9, or in its opposite or engaging position.

When the feeler I descends normally through an unoccupied recess $c$, it moves the slide 120 to the left in Fig. 8, and this movement brings the cam incline 127 into the path of the pin 117; hence the backward reciprocation which carries the pin 117 into the notch 125 pushes it upwardly in Fig. 9, so that the hook 113 swings over and engages the shank 80 of the cradle. The reciprocation of the slide M to the right in Figs. 6 and 9, by pushing the shank 80, carries the cradle P, lifter Q, and feed-bar H, with it, thus performing the return movement of the feed-bar, whose feed-fingers $e$ are depressed so as to pass beneath the heads. At the end of this idle return movement the slide M moves back to its original position, and this movement is communicated through the hook 113 and shank 80 to the cradle P, and through lifter Q to the feed-bar H, thereby imparting a normal forward feeding movement.

When, however, the feeler I is arrested by striking an intruding can head, the slide 120 is not moved to the right in Fig. 8, but stops in such position that its cam incline 126 is in the path of the pin 117, so that the pin on striking this swings the hook over to the position shown in Fig. 9 and enters the notch 125. Thereupon the next reciprocating movement of the slide M and connected parts, while it pushes the cradle P to the right in Figs. 6 and 9, leaves it there, there being no hook engagement to move it back to the left, whereby to execute the normal feeding movement. The function of the hook 112 is to complete the full forward movement of the cradle when the hook 113 is released by engagement with the cam incline 126; in such case the hook 112 engages the shank 80 before the hook 113 disengages it. This movement of 112 is due to its shoulder striking the end of the cam groove 116.

To guard against the possibility that the slide 120 might be displaced by reason of the resistance of the pin 117 to the movement to be imparted by the cam inclines 126, 127,—it is provided with a locking rib 128 which, according to the position of the slide, enters into one or other of two grooves 129, 130, in the under side of the slide M (conveniently formed in an inserted plate 220, Fig. 8ª). The slide 120 being first displaced, the slide M moves over it, so that the groove 129 or 130, which happens to be in alignment with the rim 128, slides over and engages that rib and thereby locks the slide 120 from further displacement until freed by the return movement of the slide M. Thus, any reaction between the resisting pin 117 and the incline 126 or 127 is taken up against the slide M, which is so guided that it cannot move to right or left in Fig. 8.

*Body feed control.*—The feed conveyor B (Figs. 1 and 2) may have the usual chain 134 with pushers 135 for propelling the can bodies $b$ (Fig. 1), and may, as shown in Fig. 2, have means for laterally transferring the can bodies to a trough B', where they are engaged successively by a reciprocating plunger $g$ and pushed into the carrier or dial D, as already described, each such body coming under the previously placed head $a$. It is necessary, as already explained, when a head has failed to be fed, so that the recess $c$ in the dial would receive only the body, to arrest the body feed and prevent a body being fed into such recess, which would result in a spoiled can. The detection of a missing head is the function of the feeler J.

The body feed mechanism is driven through a clutch which may be disengaged to stop the body feed. In the construction shown best in Figs. 1, 21 and 22, a power-driven miter gear 137 drives a miter gear 138 which carries one member 139 of a clutch $h$, the other member 140 of which is longitudinally movable to rotatively couple (as by a spline or sliding key such as shown at 141) to a sprocket wheel 142 which directly drives the body feed. The clutch member 140 is pressed against its mate by a spring 143, and has an angular projection 144 which enters an angular or beveled notch 145 in the clutch member 139. Thus the drive is through the beveled or wedging surfaces of 145, 144, which are held in engagement only by the stress of spring 143. This engagement is sufficient to carry the entire work of driving the body feed; but if the parts 140—142 are positively stopped, the inclined surfaces will ride over one another, compressing the spring 143, so that for one revolution (or a multiple thereof) the clutch is disengaged and the drive is stopped.

The connections between the feeler J and the clutch mechanism for effecting this stoppage will now be described. The feeler J (see Fig. 4) is mounted on an upright spindle 150 which is lifted and lowered once during each feed movement. It is connected to a twin feeler pad J' similarly mounted on a spindle 151 and having precisely like movements. Directly beneath the pad J' is a vertical pin 160 sliding in suitable bearings pressed up by a light spring 161, its upward movement being limited by a stop 162. Beneath the lower end of pin 160 and pressed up against it by a spring 163, projects a horizontal arm 165 connected to a pendulous arm 166 pivoted at 167. The parts 165, 166 are made of light weight so as to swing freely, but with minimum momentum. The lower end of the arm 166 swings over a shoulder 170 (Fig. 21) on a clutch-operating lever 171 co-operating with the clutch $h$. The clutch member 139 carries a cam projection 172 which engages a roller 173 carried by some part of the lever 171. As shown, this lever comprises arms 174 and 175 connected by a shaft 176 turning in a fixed bearing 177. The arm 174 carries the roller 173; the arm 175 has on its end a hook 178 which is adapted to enter a notch in the hub 180 of the sprocket wheel 142 and engage a stop shoulder 179 terminating such notch. These parts are best shown in Figs. 21 and 22, the former of which shows the cam 172 pressing back the roller 173; this is accomplished against the stress of a spring 181 which presses the roller against the cam and tends, when the roller passes the cam, to force the hook 178 into the notch to engage the stop shoulder and thereby arrest the driven member of the clutch. In normal operation the pendulous arm 166 stands directly above the stop shoulder 170 and prevents the hook 177 entering the notch, so that at each revolution the cam simply presses back the roller slightly enough to free the stop shoulder 170 from the arm 166 so that the latter may swing freely while the cam projection is thus acting on the roller. If, however, a head is missing in the position $a^2$, so that the feeler J is not arrested thereby, but moves down for its full stroke, the equal movement of the pad J' presses down the pin 160 and causes the arm 166 to be swung (to the left in Fig. 22), which occurs at the instant when the cam 172 is pressing back the roller 173 so as to free the arm 166 from the friction of the stop 170; consequently the arm 166 swings over beyond the stop 170, and consequently upon the cam passing the roller, the arm 166 is not in position to prevent the swing of the lever 171 in response to the stress of the spring 181, with the result that the spring pulls the lever upward and causes the hook 178 to enter the notch in the sprocket wheel hub, and when the stop-shoulder 179 reaches the hook it is positively stopped thereby. This positive stoppage causes the inclined portions 144, 145 to free themselves by the backing off of the clutch member 140 against the stress of spring 143. Consequently the sprocket 142 is stopped and remains motionless for one rotation of the driving member of the clutch.

The body feed is driven from the sprocket 142, so that the stoppage of the rotation of the sprocket arrests the body feed for one complete feeding movement. The sprocket 142 (or any other equivalent transmission member controlled by the stop mechanism described) may communicate motion to the body feed mechanism in any one of various ways. A convenient construction is that shown, wherein the sprocket wheel 142 is connected by a chain 185 to drive a sprocket 186 fixed on a shaft 187 which carries fixed to it a sprocket 188 which through a chain 189 drives a sprocket on the rear of a cam 190 on a shaft 191. This cam drives the feed plunger $g$ (Fig. 2) by which the body is pushed under the head $a$. From the chain 185 motion is also taken to drive the feed chain 134 by which the can bodies are propelled step by step along the table B. The details of this feed mechanism are immaterial to the present invention, the feed mechanism illustrated being of a known type which may be substituted by any other desired or suitable feed mechanism.

*Drive mechanism.*—The chain drive mechanism, together with that for reciprocating the feelers I, J, and their connections, will now be described:

The machine is driven from any suitable source whereby rotation is communicated to a main shaft 200 (Fig. 4) which through miter gears 201 drives at equal speed an upright shaft 202. Between the miter gears and the shaft 202 is a slip clutch 203, one member 204 of which is rotatably coupled to the hub of the miter gear, and the other member 205 is splined or otherwise rotatably coupled to the shaft 202. The two clutch members have an impositive engagement (similar to that shown in Fig. 22) consisting of an angular notch in one entered by an angular tooth in the other, so that if the shaft 202 is stopped, the driving parts may continue to rotate by the angular tooth lifting out from the notch, the upward movement of the clutch member 205 being taken up in a spring 206 by which the clutch members are yieldingly pressed together. The upper end of shaft 202 is connected by miter gears 207 to drive the shaft L' already referred to (see Fig. 7), which shaft drives the cam-shaft L through spur gears 76, 76', having like numbers of teeth, so that the several shafts are driven in unison. All the cams hereinbefore referred to are carried on the shafts L and L'.

The feelers are reciprocated from a cam 210 carried on the shaft 200 (Fig. 4). The cam 210 has a cam groove 211 (Fig. 7) engaged by a roller 212 carried at the lower end of a vertical rod 214, the upper end of which connects to an arm 215 (Fig. 4) fixed on a shaft 105 which extends across the machine as shown in Fig. 9, and has a similar arm 215" fixed on its opposite end. Loose on the shaft 105 are two long arms 220 and 220', which are connected to the shorter arms 215, 215' through springs $s$, one of which is shown in dotted lines in Fig. 4, their locations being shown at $s$ $s$ in Fig. 9. These springs each connect a pin 216 on the shorter arm to a boss 221 on the longer arm, the normal relation between the arms being determined by a connecting bolt 222 having set nuts engaging beneath the boss. The upward movement imparted through the rod 214 is transmitted positively through the bolts to the longer arms 220. On the downward movement, however, the transmission is yielding, since the springs $s$ may be compressed. The outer ends of the arms 220, 220' are forked and engage a collar or neck in vertical slides 225, 225'. The slide 225 (being suitably guided in a sprocket 226) has on its upper portion rack teeth 227 which engage with pinion teeth cut in a horizontal spindle 230 (Fig. 8) housed in a bracket arm 231 (Fig. 4), whereby with the vertical movements of the slide 225 this spindle is rotated. The spindle has like pinion teeth formed on it to engage with the upright racks 150 and 151 which carry the feeler J and pad J' respectively. From this it results that the upward movements imparted from the rod 214 are positively communicated to lift the feeler J and pad J'; whereas the downward movements are impositively communicated, so that when the feeler J is arrested by contact with a head, the pad J' is arrested at the same level and the remaining movement is taken up in the spring $s$.

Like operations occur with respect to the feeler I. The vertical slide 225' has rack teeth 227' on its upper part engaging in like manner with a pinion spindle 230' (Figs. 8 and 6) which is cut with pinion teeth engaging a rack 150' (Fig. 6) which at its lower end carries the feeler I. It results that the upward movements transmitted from the cam 210 through the rod 214 are communicated positively to lift the feeler I, while the downward movements are yielding, so that when the feeler I is stopped by contact with a head, the interposed spring $s'$ takes up the remaining movement.

While the various mechanical movements thus described for transmitting motion to the cam shafts of the machine and for operating the feelers I, J, are convenient and desirable means for that purpose, obviously they may be replaced by any others of a variety of known mechanical movements adapted to communicate similar motions to the respective parts.

What I claim is:

1. A feed mechanism for can-heading machines, comprising a carrier having pockets for receiving heads and bodies and conveying them together in paired relation to the seaming mechanism, means for feeding heads to said pockets, means for feeding bodies to said pockets, and means operable upon a misfeed of a head for stopping said body feed for a single feeding movement, to insure against the feeding of a body to a pocket which has received no head.

2. A mechanism according to claim 1, having a reciprocating feeler movable into the pockets in successive positions thereof, said feeler controlling the body feed stopping means.

3. A feed mechanism for can-heading machines comprising means for feeding heads, means for feeding bodies, means for delivering out headed cans, a carrier receiving the heads, a feeler movable with respect to the carrier and located in position to encounter a head if carried past the delivery point, and means controlled by the feeler upon its encounter with such head for interrupting the head feed whereby when a previously-fed head remains in a given pocket of the carrier, to prevent double feeding.

4. A feed mechanism for can-heading machines, comprising a carrier having pockets for receiving heads and bodies and conveying them in paired relation to the seaming mechanism, means for feeding heads to said pockets, means for feeding bodies to said pockets, feelers movable into the pockets to determine the presence of heads therein, and means controlled by said feelers for interrupting said respective feeds for only a single feeding movement, whereby the head and body feeds are controlled according to the presence or absence of heads in said pockets.

5. A feed mechanism for can-heading machines comprising a carrier having pockets for receiving the heads and bodies, means for feeding heads into said pockets, means for later feeding bodies into said pockets, a reciprocating feeler movable into one of such pockets and normally stopped by the presence of a head previously fed therein, a stop device for interrupting a single feed movement of the body feed, and means whereby upon a mis-feed of a cover the unchecked movement of the feeler actuates such stop device to prevent the body being fed into such pocket.

6. A feed mechanism according to claim 5, the body-feeding means adapted to intermittently feed successive bodies to the carrier, a driving member actuating said feeding means, an interposed separable clutch, and stop means actuated by the excess movement of said feeler to release said clutch during one feeding movement.

7. A feed mechanism according to claim 5, the body-feeding means driven through a yielding clutch, a stop device for arresting the driven member of such clutch, and connecting means between such feeler and stop mechanism adapted on an abnormal movement of the feeler to engage the stop mechanism and stop the body feed for one feeding movement.

8. A feed mechanism for can-heading machines comprising means for feeding heads, means for feeding bodies, a carrier having pockets receiving the heads and bodies, and means for interrupting the head feeding means comprising a reciprocating feeler movable into said pockets in one position thereof, a stop device for arresting the feeding movement of the head-feeding means, and means whereby the arrest of said feeler by encountering a head abnormally present in said pocket actuates such stop device and arrests the head feed for one feeding movement.

9. A feed mechanism for can-heading machines comprising means for feeding heads, and a carrier having pockets for receiving the heads, such head-feeding means comprising a continuously-reciprocating slide, a feed bar normally reciprocated thereby and adapted at each stroke to feed a head, means intervening said slide and feed bar for connecting or disconnecting them, and a feeler actuating said last named means reciprocating into a pocket of the carrier and adapted on being arrested by encountering a head therein, to operate said last-named means to disconnect the feed bar from the slide and stop the feed during one feeding movement.

10. A feed mechanism for can-heading machines comprising means for feeding heads, and a carrier having pockets for receiving the heads, such head-feeding means comprising a continuously-reciprocating slide, a feed bar normally reciprocated thereby and adapted at each stroke to feed a head, engaging means normally connecting said feed bar and slide together, a feeler reciprocating at each stroke into a pocket of the carrier, and a connection between the feeler and such engaging means whereby the feeler, when arrested by encountering a head in said pocket, operates said engaging means to free the feed bar from the slide and arrest the feed for one feeding movement.

11. A feed mechanism according to claim 10, such engaging means comprising a hook carried by the slide and making a locking engagement with the feed bar, a transversely-movable cam member adapted to be encountered by said engaging means at each stroke of the slide and adapted according to its position to throw the engaging means into locked or unlocked position, and connected to said feeler to be positioned thereby.

12. A feed mechanism according to claim 10, such engaging means comprising a hook carried by the slide and making a locking engagement with the feed bar, a transversely-movable slide having cam surfaces adapted to be encountered by said engaging means at each stroke of the reciprocating slide, said transverse slide connected to said feeler to be positioned thereby.

13. A feed mechanism according to claim 10, such engaging means comprising a hook carried by the slide and making a locking engagement with the feed bar, said hook having a projecting pin, and a transversely-movable cam slide having cam surfaces adapted to be engaged by said pin to position the hook according to the location of said cam slide, and said cam slide connected to said feeler to be located thereby according to the position of the feeler.

14. A feed mechanism according to claim 10, such engaging means comprising a hook carried by the slide and making a locking engagement with the feed bar, said hook having a projecting pin, and a transversely-movable cam slide having cam surfaces adapted to be engaged by said pin to position the hook according to the location of said cam slide, said cam slide connected to said feeler to be located thereby according to the position of the feeler, and means for anchoring said cam slide in position prior to and during its engagement with said pin, comprising reciprocal ribs and grooves formed on the cam slide and reciprocating slide respectively, whereby at each stroke of the reciprocating slide the cam slide is locked in position.

15. A can-head feeder comprising a holder for a stack of heads, separators engaging from opposite sides to separate the lowest head from the stack, and distinct lifting means movable subsequently to first enter above the lowest head and then by an upward movement to bodily lift the superposed heads to free the separated lowest head.

16. A can-head feeder comprising a holder for a stack of heads, separators engaging the lowest heads from opposite sides, means for moving at least one of said separators to separate the lowest head from the stack, and means for subsequently lifting the superposed heads to free the lowest head.

17. A can-head feeder comprising a holder for a stack of heads, a separator entering just above the flange of the lowest head to separate the lowest head from the stack, and means for tilting said separator to pry up the flange of the next superposed head.

18. A can-head feeder comprising a holder for a stack of heads, separators engaging from opposite sides and seeking to enter between flanges of adjoining heads, and means for rocking a separator to separate such flanges.

19. A can-head feeder comprising a holder for a stack of heads, separators engaging from opposite sides and seeking to enter between flanges of adjoining heads, said separators yieldingly mounted so that when either encounters closely adjacent flanges it may remain in abutment therewith while the other enters between the flanges, and means for rocking such separators adapted to engage the separator which has advanced to enter between the flanges.

20. A can-head feeder comprising a holder for a stack of heads, separators engaging from opposite sides and seeking to enter between flanges of adjoining heads, said separators yieldingly mounted so that when either encounters closely adjacent flanges it may remain in abutment therewith while the other enters between the flanges, and means for rocking such separators disengaged therefrom except when they advance to enter between the flanges, and adapted thereupon to engage and rock the separator to separate such flanges.

21. A can-head feeder comprising a holder for a stack of heads, separators engaging from opposite sides to separate the lowest head from the stack, independently movable lifters adapted to subsequently enter between the separated flanges, and means movable subsequently for elevating such lifters to lift the stack from the separated lowest head.

22. A can-head feeder comprising a holder for a stack of heads, separators engaging from opposite sides to separate the lowest head from the stack, said separators yieldingly mounted so that when either encounters closely-adjacent flanges it may remain in abutment therewith while the other enters between the flanges, means for rocking the separator which has entered between the flanges, lifters adapted to subsequently enter between the separated flanges, means for withdrawing the separators, and means for elevating the lifters to lift the stack.

23. A can-head feeder comprising a holder for a stack of heads, separators engaging from opposite sides to separate the lowest head from the stack, said separators yieldingly mounted so that when either encounters closely-adjacent flanges it may remain in abutment therewith while the other enters between the flanges, means for rocking the separator which has entered between the flanges first in one direction and then in the opposite direction, and lifters entering from opposite sides between the separated flanges, the one lifter adapted to enter in advance of the other.

24. A can-head feeder comprising a holder for a stack of heads, separators engaging from opposite sides to separate the lowest head from the stack, said separators yieldingly mounted so that when either encounters closely-adjacent flanges it may remain in abutment therewith while the other enters between the flanges, means for rocking the separator which has entered between the flanges first in one direction and then in the opposite direction, and lifters entering from opposite sides between the separated flanges, with means for entering one lifter after the first rocking movement, and for entering the other lifter after the second rocking movement.

25. A can-head feeder comprising a holder for a stack of heads, means for separating and feeding the lowermost head from the stack and delivering them successively therefrom, and a power-driven ejector movable across the path of the heads adapted to engage inverted heads and eject them to prevent their being delivered.

26. The combination of claim 25, further characterized in that the ejector has a reciprocating movement in a path above heads normally placed.

27. The combination of claim 25, further characterized in that the ejector is moved in step with the head feed and arranged in such movement to engage a head at a stopping point between its feeding movement and its delivering movement, whereby whenever a head is fed inverted, it is ejected from such stopping position.

28. A can-head feeder comprising a holder for a stack of heads, separators engaging the lowest heads from opposite sides, said separators yieldingly mounted, so that if either collides with a head it may yield instead of entering between the heads, means for moving at least one of said separators to separate the lowest head from the stack, and means for subsequently lifting the superposed heads to free the lowest head.

29. A feed-mechanism for a can-heading machine comprising means for feeding heads, means for feeding bodies, means for conveying the fed heads and bodies in paired relation, means for interrupting the body feed without stopping the machine, and controlling means therefor comprising a feeler movable into the position of a fed head and adapted if not stopped thereby to arrest the body feed for a single stroke, whereby to prevent the feeding of the body corresponding to the head which missed feed.

30. A feed mechanism for can-heading machines comprising a carrier having pockets for receiving heads, means for feeding heads into said pockets, means for feeding bodies. a reciprocating feeler movable into said pockets in one position thereof and normally stopped by the presence therein of a head previously fed thereto, a stop device for interrupting a single feed-movement of the body feed, and means whereby when a cover is absent from a pocket the unchecked movement of the feeler in such pocket actuates said stop device to prevent the feed of the body corresponding to the head which normally should have been fed to said pocket.

31. A feed mechanism for can-heading machines comprising a head-seaming mechanism, a carrier having pockets for receiving heads, means for feeding heads into said pockets, means for feeding bodies, means for uniting the bodies and heads and carrying them successively to the seaming mechanism, a reciprocating feeler movable into said pockets in one position thereof and normally stopped by the presence therein of a head previously fed thereto, a stop device for interrupting a single feed-movement of the body feed, and means whereby when a cover is absent from a pocket the unchecked movement of the feeler in such pocket actuates said stop device to prevent the feed of the body corresponding to the head which normally should have been fed to said pocket.

In witness whereof, I have hereunto signed my name.

CHARLES GUERITEY.

CERTIFICATE OF CORRECTION.

Patent No. 1,747,626. Granted February 18, 1930, to

CHARLES GUERITEY.

It is hereby certified that the above numbered patent was erroneously issued to the inventor said "Gueritey", whereas said patent should have been issued to "E. W. Bliss Company, of Brooklyn, N. Y., a corporation of Delaware" said corporation being assignee of the entire interest in said invention, as shown by the records of assignments in this office; and that the said Letters Patent should be read with this correction therein that the same may conform to the record of the case in the Patent Office.

Signed and sealed this 15th day of April, A. D. 1930.

(Seal)

M. J. Moore,
Acting Commissioner of Patents.